United States Patent [19]
Tsukiyama et al.

[11] Patent Number: 5,171,458
[45] Date of Patent: * Dec. 15, 1992

[54] HOT FORMING MOLD AND METHOD OF MANUFACTURING THE SAME

[75] Inventors: Koichi Tsukiyama, Yokohama; Hideaki Takahashi, Sendai; Koichi Tsutsumi, Ichikawa; Takashi Watanabe, Chiba; Chiharu Wada, Tokyo; Keitaro Kunugiza, Yokohama; Satoshi Teramura, Chiba, all of Japan

[73] Assignees: Onoda Cement Co., Ltd., Onoda; Onoda Alc Co., Ltd., Nagoya, both of Japan

[*] Notice: The portion of the term of this patent subsequent to Oct. 30, 2007 has been disclaimed.

[21] Appl. No.: 585,567

[22] Filed: Oct. 5, 1990

Related U.S. Application Data

[60] Division of Ser. No. 256,015, Oct. 11, 1988, Pat. No. 4,966,629, which is a continuation-in-part of Ser. No. 125,046, Nov. 25, 1987, abandoned.

[30] Foreign Application Priority Data

Sep. 25, 1987 [JP] Japan ................... 62-238778

[51] Int. Cl.[5] .............................................. B28B 7/34
[52] U.S. Cl. .................................. 249/134; 106/38.27; 106/38.3; 106/38.9; 501/123; 501/133
[58] Field of Search ................... 106/38.27, 38.3, 38.9; 501/123, 133, 154; 249/134; 425/403

[56] References Cited

U.S. PATENT DOCUMENTS

| | | | |
|---|---|---|---|
| 3,690,366 | 9/1972 | Schwartz | 106/38.35 |
| 3,802,891 | 4/1974 | Horton | 106/38.3 |
| 3,959,212 | 5/1976 | Rockett et al. | 106/35 |
| 4,966,629 | 10/1990 | Tsukiyama et al. | 106/38.27 |

Primary Examiner—David A. Simmons
Assistant Examiner—William J. Matney, Jr.
Attorney, Agent, or Firm—Nikaido, Marmelstein, Murray & Oram

[57] ABSTRACT

This invention provides a hot forming mold made of xonotlite group materials such as xonotlite, or wollastonite made therefrom which are known as a heat-resisting materials. By hot pressing these materials to high bulk density e.g., 0.6 to 2.20, a mold suitable for use in hot forming, having increased bending strength and hardness can be efficiently made. Such molds are made by filter pressing an aqueous slurry of xonotlite, then drying the pressed product to remove moisture at a temperature less than about 700° C., and then cutting out the mold for use in molding plastic, glass and the like. By heat treating this mold product at a temperature of about 700° to 1200° C. the mold so produced can be subjected to machining and can be used as a mold for superplastic forming aluminum, titanium and the like.

2 Claims, 1 Drawing Sheet

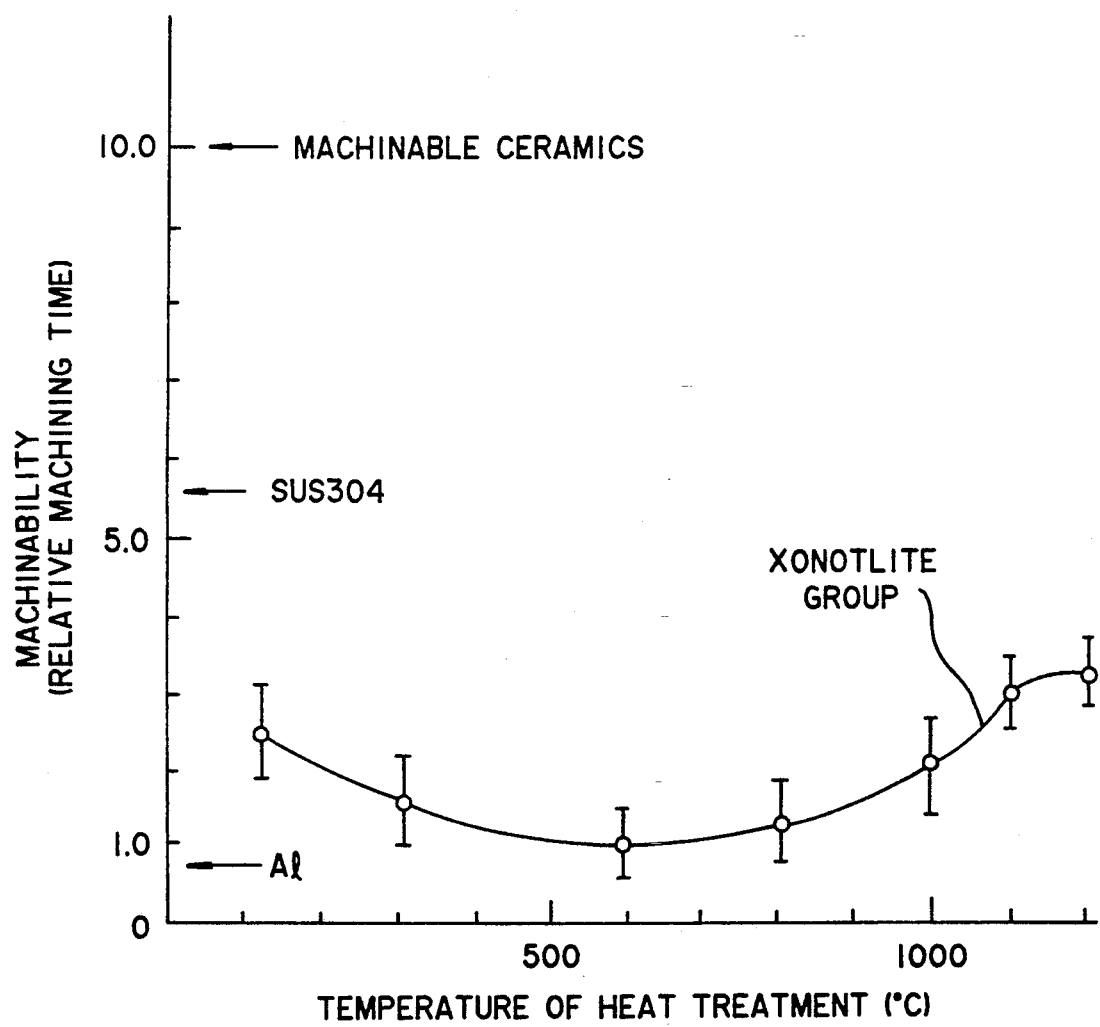

HOT FORMING MOLD AND METHOD OF MANUFACTURING THE SAME

BACKGROUND OF THE INVENTION

This application is a divisional application of Ser. No. 256,015 filed Oct. 11, 1988, now U.S. Pat. No. 4,966,629, which is a continuation-in-part of application Ser. No. 125,046 filed Nov. 25, 1987, now abandoned.

FIELD OF THE INVENTION

This invention relates to a hot forming mold which is excellent in heat resistance, machinability and the like, and more particularly to a hot forming mold suitable for hot gas pressure forming and to a method of manufacturing the same.

DESCRIPTION OF THE PRIOR ART

The hot gas pressure forming method has various advantages, including: (1) under isotopic pressure a molded article having a uniform density may be obtained, (2) a complicated shape of a molded article can be obtained with high accuracy in a single step, (3) the surface of a molded article is beautiful. Therefore, attention has been recently paid to this method in the field of "superplastic forming and diffusion bonding".

The superplastic forming and diffusion bonding method has received much attention as a technique for integral manufacturing of the airframe of an airplane. A superplastic metal sheet such as aluminum alloy, titanium alloy, two-phase stainless steel and the like is subjected to hot-forming and/or diffusion bonding by inert gas pressure at high temperature. The forming molds used must be capable of withstanding a forming temperature of approximately 600° C. for aluminum alloy and of approximately 1,000° C. for titanium, alloy and two-phase stainless steel, and must have dimensional precision of less than 0.5%.

In the case of sheet-like prepreg material, for example, such as glass fiber reinforced plastic (GFRP), carbon fiber reinforced plastics (CFRP), and amide fiber reinforced plastics (AFRP), attention has been paid to a so-called autoclave molding method in which these materials are laminated and then molded under gas pressure in the autoclave. In this case, the forming temperature is typically 120° C. to 200° C., and up to 350° C. at the maximum.

Other than the hot gas pressure forming methods described above, there is a hot forming method for glass for automobiles, in which the dimensional precision and surface precision of hot forming molds are required. In this case, the hot forming mold must have heat resistance up to about 800° C. at the maximum and a low coefficient of thermal expansion.

In the molding techniques, the hot forming molds are required to have excellent heat resistance, and to be of a large size, up to on the order of several meters. Conventional heat-resisting molds of heat-resisting alloys, such as austenite stainless steel, Inconel or the like, or molds of heat resisting epoxy resins, are difficult for practical uses, because the expense of manufacturing large ingots of said materials and of machining the ingots is extremely high. Further, harmful gases occur at the time of manufacturing epoxy resin molds, giving rise to deterioration of material characteristics in hot forming molds made therefrom.

In view of their heat resistance, ceramic materials such as alumina, silicon, etc. are excellent materials. But they are extremely difficult to work and to transform into large ingots.

SUMMARY OF THE INVENTION

This invention provides a hot forming mold and a method of manufacturing the same, which can be easily used to make large ingots, is high in heat resistance, has sufficient strength and hardness for hot forming, and provides machinability with a good surface. The xonotlite group of materials of this invention includes xonotlite and wollastonite, which was made by heating xonotlite to above 700° C.

In this invention, xonotlite groups materials, which are calcium silicate hydrates, are used as the material of a hot gas forming mold. The use of such a hot gas forming mold is beyond conventional wisdom because it is known that a hot forming mold should be made of heat resisting alloy and of heat resisting epoxy resin. Xonotlite group materials are principally used as lightweight, heat insulating and fire proof calcium silicate building materials. The calcium silicate hydrate building materials have a bulk density of 0.2 to 0.5 $g/cm^3$, and a bending strength of less than 50 $kgf/cm_2$ at a bulk density of about 0.5 $g/cm_3$. Thus it would generally be considered that calcium silicate building materials would hardly be appropriate for use as a material for making a hot forming mold.

The present inventors have found that a mold made of xonotlite group materials has a high bending strength and a hardness suitable for hot forming at a temperature ranging from 120° C. to 1200° C., if its bulk density is 0.6–2.20 $g/cm^3$, and if it was subjected to heat treatment after its formation into a mold article.

That is, a hot forming mold according to this invention is characterized as having been made of xonotlite group, having a bulk density being 0.6 to 2.20 $g/cm^3$, a bending strength of at least 100 kg/cm, and a Vickers hardness of at least 4. The hot forming mold described above has good properties, such as bending strength, Vickers hardness, and machinability with good finished surface.

The hot forming mold of this invention is formed by either of the following two processes; (1) an aqueous slurry of xonotlite is filter-pressed and dried, whereby a mold article is obtained; the mold article is then heat-treated at a temperature of less than 700° C. if necessary; and thereafter the mold article is cut out, and (2) an aqueous slurry of xonotlite is filter-pressed and dried, whereby a mold article is obtained; the mold article is then heat-treated at a temperature ranging from 700° to 1200° C. to convert the xonotlite to wollastonite; and finally the heat-treated mold is cut out.

The drying described above means drying at a temperature between 100°–120° C., so as to remove adhering water from the surface of xonotlite. The heat-treatment means not only heating at less than 700° C. in the case of the above mentioned process (1) thereby removing the water from unreacted xonotlite compound, but also heating at a temperature in the range from 700° to 1200° C. in the case of the above mentioned process (2) whereby the transformation from xonotlite to wollastonite occurs. It should be noted that although the equilibrium temperature of phase transformation from xonotlite to wollastonite is at about 450° C., the actual temperature of this transformation is more than 700° C. Therefore heating to below 700° C. under the conditions set forth herein does not actually give rise to the phase transformation of xonotlite to wollastonite.

EXPERIMENTAL EXAMPLES

Experiments were conducted to evaluate the suitability of xonotlite group of materials to use as a hot forming mold, and the results will be described in detail.

EXPERIMENTAL EXAMPLE 1

Bending strength, Vickers hardness, machinability, and change in dimension were measured on small test specimens to determine whether a mold made of xonotlite group materials is satisfactory as a hot forming mold. Table 1 shows the results of measurements and therefore the appropriateness of applicants' invention to use xonotlite as a hot forming mold.

The test specimens were prepared as follows. An aqueous slurry of industrially produced xonotlite was filter-pressed to give a mold article of 15 cm × 8 cm × 1 cm is size. Bulk density of the mold article was controlled to 0.5, 0.7, 0.9, 1.0 and 1.2 g/cm³ by varying filter-pressing load. The mold articles were thereafter dried at 120° C. for 12 hours, to produce the test specimens.

The test specimens were also formed by the heat-treatment of dried mold articles under conditions of rising temperature at a rate of 100° C./hr. for 12 hours.

Test specimens were also formed by the heat treatment of dried mold articles under conditions of rising temperature at a rate of 100° C. Test specimens were taken at the respective temperatures of 300°, 600°, 800°, 1000°, 1100° and 1200° C., upon their temperature was allowed to decrease in a furnace.

The temperature of this heat-treatment was selected according to the kinds of material being used:
1. 300° C. for plastic forming mold;
2. 600° C. for aluminum alloy superplastic forming mold;
3. 800° C. for glass forming mold;
4. 1000° C. for titanium alloy superplastic forming mold;
5. 1100° C. for 2-phase stainless steel superplastic forming mold;
6. 1200° C. as the maximum temperature for a hot forming mold;

Large shrinkage occurred at heat treatment temperatures of 800°, 1000°, 1100° and 1200° C. because of the transformation of the mold material from xonotlite to wollastonite. After heat-treatment, however, the mold material shrinkage was 0.5% or less. Examples of such materials are marked in Table 1 by *.

Machinability was evaluated using a longitudinal type milling machine with an end mill made of high speed steel of 22 mm in diameter, and done in terms of the roughness of the machined surface and of machining time with varying depth of cut, feed speed and rotation speed.

The FIGURE shows the relationship between the temperature of heat treatment and the relative machining time. In this FIGURE, the relative machining times of aluminum, stainless steel (SUS304) and machinable ceramics (Macor) are also shown for comparison.

These data indicate that the machinability of a hot forming mold made according to this invention is equal to that of aluminum and is about 60% of SUS 304, and the hot forming mold is superior in machinability to machinable ceramics.

TABLE 1

| Temperature °C. | Bulk Density g/cm³ | Shrinkage percentage in a direction of plate-thickness % | Bending strength kgf/cm² | Vickers hardness | Machinability Relative machining time | Machinability Surface precision | Availability as a hot forming mold |
|---|---|---|---|---|---|---|---|
| 120 | 0.460 |  | 31 | 1.1 | △ | ▽▽▽ | Not available |
|  | 0.710 |  | 156 | 4.1 | △ | ▽▽▽ | Available |
|  | 0.909 |  | 186 | 8.5 | △ | ▽▽▽ | Available |
|  | 0.953 |  | 194 | 11 | △ | ▽▽▽ | Available |
| 300 | 0.441 | 0.29 | 59 | 1.1 | ○ | ▽▽▽ | Not available |
|  | 0.692 | 0.49 | 136 | 4.1 | ○ | ▽▽▽ | Available |
|  | 0.889 | 0.30 | 172 | 8.5 | △ | ▽▽▽ | Available |
|  | 0.980 | 0.30 | 173 | 11 | △ | ▽▽▽ | Available |
| 600 | 0.456 | 0.29 | 75 | 1.2 | ◎ | ▽▽▽ | Not available |
|  | 0.663 | 0.34 | 135 | 4.2 | ◎ | ▽▽▽ | Available |
|  | 0.848 | 0.17 | 164 | 8.4 | ○ | ▽▽▽ | Available |
|  | 0.982 | 0.23 | 175 | 12.5 | ○ | ▽▽▽ | Available |
| 800 | 0.450 | 2.32* | 52 | 1.15 | ◎ | ▽▽▽ | Not available |
|  | 0.679 | 2.78* | 114 | 4.2 | ◎ | ▽▽▽ | Available |
|  | 0.867 | 3.72* | 167 | 9.2 | ○ | ▽▽▽ | Available |
|  | 0.967 | 3.87* | 172 | 14.0 | ○ | ▽▽▽ | Available |
| 1000 | 0.467 | 4.44* | 36 | 1.15 | ○ | ▽▽▽ | Not available |
|  | 0.703 | 12.2* | 68 | 4.2 | ○ | ▽▽▽ | Not available |
|  | 0.949 | 14.8* | 118 | 9.0 | △ | ▽▽▽ | Available |
|  | 1.077 | 9.9* | 125 | 18.0 | △ | ▽▽▽ | Available |
| 1100 | 0.500 | 5.5* | 30 | 15.0 | △ | ▽▽▽ | Not available |
|  | 0.720 | 15.0* | 60 | 25.0 | △ | ▽▽▽ | Not available |
|  | 0.980 | 20.5* | 105 | 40.0 | △ | ▽▽▽ | Available |
|  | 1.100 | 15.5* | 120 | 50.0 | △ | ▽▽▽ | Available |
| 1200 | 1.320 | 33.1* | 158 | 15.7 | △ | ▽▽▽ | Available |
|  | 1.900 | 25.6* | 208 | 51.5 | △ | ▽▽▽ | Available |

1. The shrinkage percentage in the direction of plate-thickness represents shrinkage during the heat-treatment of 120°C-dried mold articles.
   The shrinkage percentage lengthwise and widthwise is less than 1/2 of that in the direction of plate-thickness, and is not represented here.
   The shrinkage after heat-treatment at 800°C to 1200°C is 0.5 or less, and is marked by *.
2. The bending strength was measured at room temperature and high temperature, and there was no difference between them. Only the bending strength at room temperature is shown as a representative value.
3. The relative machining time is normalized to that of a test specimen having a bulk density of 0.663 g/cm³ which has been subjected to a 600°C-heat-treatment, and is represented by ◎ for 0.7 to 1, by ○ for 1 to 2 and by △ for 2 to 4.
4. ▽▽▽ is the symbol of Japanese Industrial standard, and indicates the surface roughness within the range of +/− 0.8 to 0.23 microns.

EXPERIMENTAL EXAMPLE 2

One of important properties required of a hot forming mold is thermal shock resistance.

To evaluate thermal shock resistance, two experiments, each measuring acoustic emission (AE), bending strength and Vickers hardness, were conducted on the test specimens that were subjected to the following thermal cycles:

(1) Temperature was increased from room temperature up to 600° C. for thirty minutes, kept constant for thirty minutes, and thereafter decreased to 50° C. for five hours (1 cycle), and (2) Temperature was increased from 50° C. to 600° C. for thirty minutes, kept constant for thirty minutes, and thereafter decreased to 50° C. for five hours (2 cycle).

The test specimen used in the experiment was a mold article having a bulk density of 0.70 g/cm$^3$ and bending strength of 136 kgf/cm$^2$ which had been dried at 120° C. for 15 hours.

First, the occurrence of microcracks, resulting from the thermal shock, was detected under aforesaid thermal cycles by using the AE method. In the first cycle, little AE was detected, and the energy of the AE was very small. In the second cycle and thereafter, no AE occurred. After measurement of AE, the specimen was observed under a scanning electron microscope, and no crack was found.

The influence of thermal shock was also evaluated by measuring the bending strength and Vickers hardness of the test specimen, the results of which are given in Table 2.

TABLE 2

|  | Bulk density (g/cm$^3$) | Bending strength (kgf/cm$^2$) | Vickers hardness |
| --- | --- | --- | --- |
| 120 C-15 hrs dried article | 0.70 | 136 | 5.3 |
| 1 cycle | 0.69 | 115 | 5.3 |
| 2 cycle | 0.69 | 120 | 5.2 |
| 20 cycle | 0.68 | 112 | 4.8 |
| 40 cycle | 0.69 | 121 | 5.0 |
| 100 cycle | 0.70 | 127 | 5.2 |

Table 2 shows that the bending strength and Vickers hardness of the hot forming mold of the present invention was not lowered despite having been subjected to such thermal cycles, and therefore has the excellent thermal shock resistance.

The results of Experimental Examples 1 and 2 indicate that a mold made of xonotlite group materials, having a bulk density of 0.6 to 2.20 g/cm$^3$, a bending strength of 100 kgf/cm$^2$ or more, and a Vickers hardness of 4 or more, change little in dimensions with a change in temperature, are good in machinability, have a good finished surface, and are excellent in thermal shock resistance. Therefore, they can be used widely as a hot forming mold.

The hot forming mold according to this invention is manufactured by filter-pressing and drying an aqueous slurry of xonotlite, thereafter, if the mold is to be used for hot forming at a working temperature of up to about 700° C., heating the obtained mold article at a temperature of 700° C. or less, and then cutting out the desired mold. This product can be used as a plastic forming mold or an aluminum alloy superplastic forming mold.

In the case where the hot forming mold is to be used at a temperature from 700° C. to 1200° C. such as for a glass forming mold, a titanium alloy superplastic forming mold or a 2-phase stainless steel superplastic forming mold, the mold article should be heat-treated at a temperature higher than the working temperature at which the hot forming will take place, after which it is cut out to obtain the hot forming mold.

BRIEF DESCRIPTION OF THE DRAWING

The FIGURE shows the relationship between the temperature of the heat-treatment and the machinability of the hot forming mold.

DETAILED DESCRIPTION OF THE PREFERRED EMBODIMENTS

Embodiment 1

A hot forming mold for practical aluminum superplastic forming was formed.

A molded article of 40 cm×40 cm×10 cm was obtained by filter-pressing an aqueous slurry of xonotlite. The filter-pressing speed and load were several mm/minute and about 40 kg/cm$^2$, respectively.

Two types of hot forming molds were obtained. One was formed only by drying the molded article at 120° C., and the other was formed by drying at 120° C. and thereafter heat-treating at 600° C., wherein the temperature was increased at a rate of 150° C./hr, kept constant for 12 hours and then decreased in a furnace. Various properties and machinability of the two kinds of molds are given in Table 3.

The above-described two hot forming molds were used for aluminum superplastic forming which was carried out under the following conditions: retaining temperature of 550° C., retaining time of 3 hours, inert gas pressure of about 3 kg/cm$^2$ and a load of the iron top cover of the hot forming machine of 40 kg/cm$^2$. The inside of the hot forming machine was subjected to a vacuum of up to about 10$^{-1}$ Torr before heating.

Aluminum alloy molded articles obtained by use of this mold have the same dimensional precision as those made from conventional austenite stainless steel molds. A parting compound was required for the conventional mold, but no such compound was necessary for this mold.

EMBODIMENT 2

A mold article obtained by the same method as that shown in embodiment 1 was used as the starting article to prepare a mold to be used for practical titanium alloy superplastic forming.

The mold article was dried at 120° C. and further heat-treated at 1000° C. (the temperature was increased at a rate of 150° C./hr in a furnace, retained for 12 hr at 1000° C. and then cooled in the furnace), after which the desired hot forming mold was obtained. Various physical properties of the mold and its machinability are given in Table 3.

TABLE 3

| Embodiment | Heat treatment | Bulk density g/cm³ | Shrinkage % in direction of plate-thickness | Bendings strength kgf/cm² | Vickers hardness | machinability Cut amount mm | Feed mm/min | RPM rpm | Surface precision | Relative machining time |
|---|---|---|---|---|---|---|---|---|---|---|
| 1 | 120° C. dried | 0.909 | | 182 | 8.5 | 1.0 | 60 | 620 | ▽▽▽ | 2.0~2.5 |
|  | 600° C. treatment | 0.848 | 0.17 | 167 | 8.4 | 5.0 | 60 | 1000 | ▽▽▽ | 1.0 |
| 2 | 1000° C. treatment | 0.848 | −0.30* | 118 | 9.0 | 1.0 | 60 | 620 | ▽▽▽ | 2.0 |

*Expansion at 1000° C.

This mold was used in practical titanium alloy superplastic forming. The titanium was molded using an inert gas blanket at a pressure of 10 to 20 kg/cm² for about one to three hours while maintaining the temperature at about 100° C., measured every hour, under a vacuum of about 10⁻⁴ Torr. The load of the iron top cover of the forming machine was about 300 kg/cm².

A titanium alloy molded article made with this mold shows a dimensional precision equal to one made in a mold of heat resisting stainless steel (SUS 316) or heat resisting alloy (Inconel or Hastelloy). No parting compound coating was necessary in this mold.

EMBODIMENT 3

A forming mold was obtained by cutting out a mold article obtained by the same method as that of Embodiment 1, including drying at 120° C., and another forming mold was obtained by cutting a mold article obtained by the same method as that of Embodiment I and by then further heat treating it at 350° C. (the temperature was increased at a rate of 100° C./hour in furnace, held therein for 12 hours and then cooled in the furnace). Both molds were used as a plastic prepreg autoclave forming mold.

Multiple layers of glass fiber sheet-like materials used for strengthening epoxy are laminated on the present mold, covered with a sealing sheet and then pressed under a vacuum of about 10⁻³ Torr, after which the product was retained for about one hour under inert gas pressure of 5 kg/cm² at around 200° C. and thus molded.

Plastic molded articles made with these molds show dimensional precision equal to that of a conventional hardened epoxy resin (two liquid mixed type) mold.

It is noted that epoxy molds have many inconveniences such as: deterioration in heat resistance, generation of harmful gases during the production thereof from epoxy resin, and heavy weight in the case of large molds.

EMBODIMENT 4

A mold article obtained by the same method as that of Embodiment 1 was dried at 120° C. and further heat treated at 750° C. (the temperature was increased at a rate of 150° C./hr in a furnace, retained at that temperature for 12 hours, and then cooled in the furnace), after which it was cut out to prepare a press mold of male and female parts, for molding automobile glass (mainly, windshield glass).

In molding automobile windshield glass, the molding precision should be within +/−0.1 mm or so. In the conventional method, heat-resisting stainless steel is used for the compression male and female molds. Since heat-resisting stainless steel has a coefficient of thermal expansion of about 18 to 20×10⁻⁶/C, the temperature of the mold had to be uniformly controlled. A mold made according to this invention was used for deep-bending molding which was carried out under a pressure load of several kg/cm². Molding this product in a mold according to this invention could be accomplished with the dimensional precision within +/−0.1 mm without the necessity of controlling the temperature.

EFFECT OF THE INVENTION

The hot forming mold according to this invention has remarkable effects not obtained by conventional molds.

(1) The hot forming mold made of xonotlite group materials can withstand high temperatures up to 1200° C., has sufficient bending strength and surface hardness for hot forming, is easily machined, and can have its surfaces finished with good precision. It can be made at low cost.

(2) Since this mold is made by filter-pressing an aqueous slurry, large mold articles can be easily produced. A considerable cost reduction of manufacturing and machining a large hot forming mold can also be realized.

(3) As the mold of this invention is light in weight, as compared with conventional hot forming molds, and a parting compound is not required, handling them is easy. Harmful gases are not generated during their production. In addition, their bulk density can be selected according to the conditions of molding and in the case where the molding conditions, e.g., are pressure and temperature mild, a light-weight mold can be produced.

We claim:

1. A method of making a wollastonite mold having a bulk density of about 0.6 to 2.2 g/cm³, a bending strength of at least 100 kg/cm², and a Vickers hardness of at least 4, and having a predetermined size and shape comprising:

filter-pressing an aqueous slurry of xonotlite into a first green molded article;

drying said filter-pressed xonotlite molded article, at a temperature within the range of about 100° to 120° C., sufficient to thereby obtain a second molded article; and then heat treating said molded article at a temperature within the range of about 700° to 1200° C., sufficient to transform said xonotlite into wollastonite and to shrink said molded article to thereby form a wollastonite molded article.

2. A shaped article consisting essentially of wollastonite having a bulk density of about 0.6 to 2.2 g/cm³, a bending strength of at least 100 kg/cm², and a Vickers hardness of at least 4.

* * * * *